United States Patent
Mizutani et al.

(10) Patent No.: US 9,713,921 B2
(45) Date of Patent: Jul. 25, 2017

(54) INK COMPOSITION AND RECORDING APPARATUS

(71) Applicant: Seiko Epson Corporation, Tokyo (JP)

(72) Inventors: Akira Mizutani, Shiojiri (JP);
Takayoshi Kagata, Shiojiri (JP);
Masahiro Yatake, Shiojiri (JP);
Hiroshi Mukai, Shiojiri (JP)

(73) Assignee: Seiko Epson Corporation (JP)

( * ) Notice: Subject to any disclaimer, the term of this patent is extended or adjusted under 35 U.S.C. 154(b) by 44 days.

(21) Appl. No.: 14/687,102

(22) Filed: Apr. 15, 2015

(65) Prior Publication Data
US 2016/0251528 A1 Sep. 1, 2016

(30) Foreign Application Priority Data
Apr. 17, 2014 (JP) .................. 2014-085294

(51) Int. Cl.
*B41J 2/21* (2006.01)
*B41J 2/01* (2006.01)
*C09D 11/30* (2014.01)
*C09D 11/10* (2014.01)
*C09D 11/106* (2014.01)

(52) U.S. Cl.
CPC .............. *B41J 2/01* (2013.01); *B41J 2/2107* (2013.01); *C09D 11/10* (2013.01); *C09D 11/106* (2013.01); *C09D 11/30* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| 5,814,685 A * | 9/1998 | Satake | ............... C09D 11/326 347/100 |
| 2009/0020036 A1* | 1/2009 | Ganapathiappan | .... C09D 11/30 106/31.13 |

FOREIGN PATENT DOCUMENTS

| JP | 3257391 B2 | 2/2002 |  |
| JP | 2012-201692 A | 10/2012 |  |
| JP | 2012251049 A | * 12/2012 | ............ B41J 2/2107 |
| JP | 2013-204025 A | 10/2013 |  |

* cited by examiner

*Primary Examiner* — Manish S Shah
(74) *Attorney, Agent, or Firm* — Harness, Dickey & Pierce, P.L.C.

(57) ABSTRACT

An ink composition includes a color material, water, and polymer particles, in which the polymer particle has a core-shell structure having a core polymer and a shell polymer, a glass transition temperature of the core polymer is 30° C. or higher, a glass transition temperature of the shell polymer is 50° C. or higher, the glass transition temperature of the shell polymer is more than 10° C. higher than the glass transition temperature of the core polymer, and the core polymer includes an aromatic monomer as a constituent unit and does not substantially include an alkyl polyol having a standard boiling point of 280° C. or higher.

18 Claims, 4 Drawing Sheets

50 nm

INK COMPOSITION AND RECORDING APPARATUS

BACKGROUND

1. Technical Field

The present invention relates to an ink composition and a recording apparatus.

2. Related Art

In the related art, a printing method using an ink jet recording system is performed by causing an droplet of an ink to fly and adhere to a recording medium such as paper. By an innovative advance of ink jet recording technology in recent years, an ink jet recording apparatus using the ink jet recording system has been used even for various recording mediums such as plastics. A technology has been developed in which core-shell type polymer particles capable of suppressing an increase in the viscosity of an ink while improving the fixability of the ink to a recording medium made of plastics are added as a binder resin.

For example, in JP-A-2013-204025, in order to improve the drying properties and storage stability of an ink, the minimum film formation temperature of a core-shell type polymer particle is defined. In addition, in Japanese Patent No. 3257391, in order to improve water resistance and discharge stability, the glass transition temperature (Tg) of a polymer particle is defined. Further, in JP-A-2012-201692, in order to improve abrasion resistance and stable dischargeability, the difference in glass transition temperature between a core portion and a shell portion of a polymer particle is defined within a range of 10° C. or less.

In this manner, in JP-A-2013-204025, Japanese Patent No. 3257391, and JP-A-2012-201692, in order to improve the characteristics of an ink such as discharge stability and abrasion resistance, the characteristics of at least one of the polymer particle, the core portion, and the shell portion are defined. However, all the polymer particles disclosed in JP-A-2013-204025, Japanese Patent No. 3257391, and JP-A-2012-201692 do not have a core-shell structure in which the core portion is present inside the shell portion and the intended characteristics may not be obtained. FIG. 4 is an image obtained by photographing a polymer particle of the related art. As shown in FIG. 4, a core-shell structure in which the shell portion covers the core portion is not stably formed in the polymer particle. When the core-shell structure is not stably formed, there is a possibility that the abrasion resistance and intermittent properties of the ink may not be improved by the polymer particle.

SUMMARY

An advantage of some aspects of the invention is to provide an ink composition in which the stability of a core-shell structure of a polymer particle is excellent and the abrasion resistance and intermittent properties of the ink composition are improved, and a recording apparatus.

The inventors have conducted an intensive investigation to solve the above problem. As a result, it has been found that the above problem can be solved by defining the glass transition temperature of a monomer and a core and shell and thus the invention has been accomplished.

That is, the invention is as follows.

[1] An ink composition including a color material, water, and polymer particles, in which the polymer particle has a core-shell structure having a core polymer and a shell polymer, a glass transition temperature of the core polymer is 30° C. or higher, a glass transition temperature of the shell polymer is 50° C. or higher, the glass transition temperature of the shell polymer is more than 10° C. higher than the glass transition temperature of the core polymer, and the core polymer includes an aromatic monomer as a constituent unit and does not substantially include an alkyl polyol having a standard boiling point of 280° C. or higher.

[2] The ink composition according to [1] which is recorded onto a heated recording medium.

[3] The ink composition according to [1] or [2], in which the shell polymer includes an aromatic monomer as a constituent unit, and the core polymer does not have an acid value.

[4] The ink composition according to any one of [1] to [3], in which the polymer particle is substantially synthesized without using an emulsifier.

[5] The ink composition according to any one of [1] to [4], in which the core polymer includes butyl (meth)acrylate as a constituent monomer.

[6] The ink composition according to any one of [1] to [5], in which the shell polymer includes methyl (meth)acrylate or (meth)acrylic acid as a constituent monomer.

[7] The ink composition according to any one of [3] to [6], in which the aromatic monomers of the core polymer and the shell polymer are respectively included in an amount of 10% by mass or more with respect to the entirety of the polymer particles, and a ratio of the aromatic monomer of the shell polymer to the aromatic monomer of the core polymer (the aromatic monomer of the shell polymer/the aromatic monomer of the core polymer) is 0.2 to 2.0.

[8] The ink composition according to any one of [1] to [7], further including an alkyl polyol having a standard boiling point of 150° C. or higher and 250° C. or lower and a Hansen SP value of 10 $(cal/cm^3)^{1/2}$ or more and 15 $(cal/cm^3)^{1/2}$ or less.

[9] The ink composition according to any one of [1] to [8], in which an average particle size of the polymer particles is 10 nm or more and 100 nm or less.

[10] The ink composition according to any one of [1] to [9], in which the glass transition temperature of the core polymer is 60° C. or lower.

[11] A recording apparatus including the ink composition according to any one of [1] to [10], and a discharge head that discharges the ink composition.

[12] The recording apparatus according to [11], in which the discharge head includes nozzles that discharge the ink composition, and multi-size dots of the ink composition are dischargeable from one nozzle.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
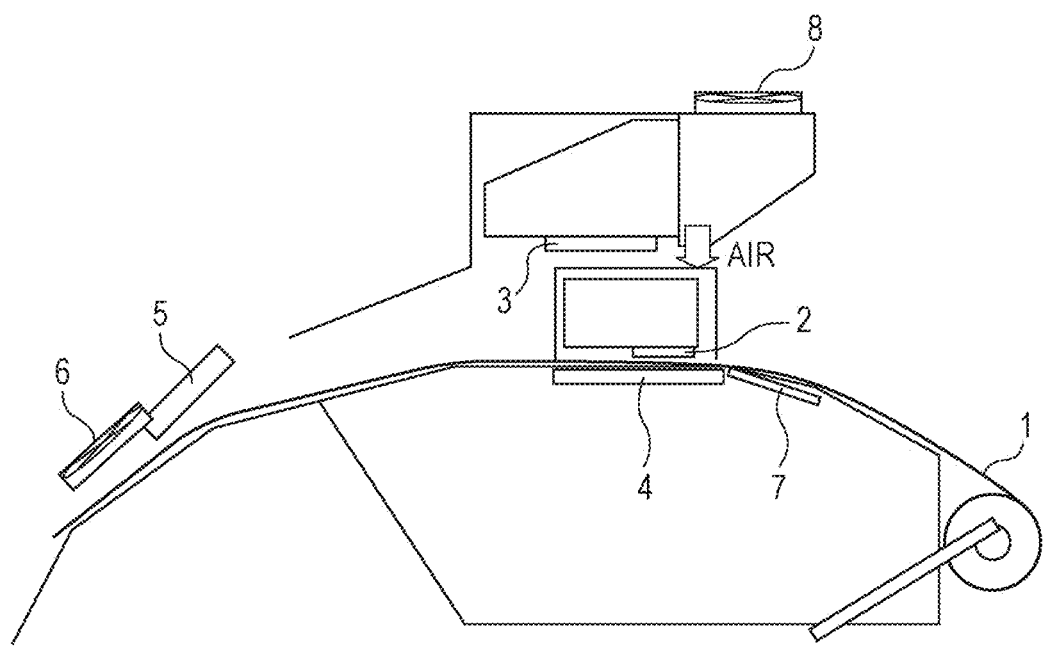
FIG. 1 is a schematic view schematically showing the configuration of an ink jet recording apparatus according to an embodiment.

Hereinafter, embodiments which realize the invention will be described. Furthermore, the invention is not limited to the following embodiments and can be variously modified within the scope of the invention.

Ink Composition

An ink composition according to an embodiment is an ink composition which includes a color material, water, and polymer particles, and the polymer particle has a core-shell structure having a core polymer and a shell polymer. A glass transition temperature of the core polymer is 30° C. or higher, a glass transition temperature of the shell polymer is 50° C. or higher, and the glass transition temperature of the shell polymer is more than 10° C. higher than the glass transition temperature of the core polymer. The core polymer includes an aromatic monomer as a constituent unit and does not substantially include an alkyl polyol having a standard boiling point of 280° C. or higher.

Color Material

The color material is selected from pigments or dyes.

Pigment

In the embodiment, the light resistance of the ink can be improved by using a pigment as the color material. As such a pigment, both an inorganic pigment and an organic pigment can be used.

The inorganic pigment is not particularly limited and examples thereof include carbon black, iron oxide, titanium oxide, and silica oxide. The inorganic pigments may be used singly or in combination of two or more kinds thereof.

The organic pigment is not particularly limited and examples thereof include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments. The following substances are mentioned as specific examples of the organic pigment.

The pigment used in a black ink is not particularly limited and examples thereof include carbon black. Carbon black is not particularly limited and examples thereof include furnace black, lamp black, acetylene black, and channel black (C.I. Pigment Black 7). In addition, a commercially available carbon black is not particularly limited and examples thereof include No. 2300, 900, MCF88, No. 20B, No. 33, No. 40, No. 45, No. 52, MA7, MA8, MA100, and No. 2200B (all product names, manufactured by Mitsubishi Chemical Corporation), color black FW1, FW2, FW2V, FW18, FW200, S150, S160, and S170, Printex 35, U, V, and 140U, and Special Black 6, 5, 4A, 4, and 250 (all product names, manufactured by Degussa AG), Conductex SC, and Raven 1255, 5750, 5250, 5000, 3500, 1255, and 700 (all product names, manufactured by Columbian Carbon Japan Ltd.), Regal 400R, 330R, and 660R, Mogul L, Monarch 700, 800, 880, 900, 1000, 1100, 1300, and 1400, and Elftex 12 (all product names, manufactured by Cabot Corporation).

The pigment used in a cyan ink is not particularly limited and examples thereof include C.I. Pigment Blue 1, 2, 3, 15, 15:1, 15:2, 15:3, 15:4, 15:6, 15:34, 16, 18, 22, 60, 65, and 66, and C.I. Vat Blue 4, and 60. Among these examples, at least one of C.I. Pigment Blue 15:3 and 15:4 is preferably used.

Examples of the pigment used in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:4, 57, 57:1, 88, 112, 114, 122, 123, 144, 146, 149, 150, 166, 168, 170, 171, 175, 176, 177, 178, 179, 184, 185, 187, 202, 209, 219, 224, 245, 254, and 264, and C.I. Pigment Violet 19, 23, 32, 33, 36, 38, 43, and 50. Among these examples, at least one selected from the group consisting of C.I. Pigment Red 122, C.I. Pigment Red 202, and C.I. Pigment Violet 19 is preferably used.

Examples of the pigment used in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 150, 151, 153, 154, 155, 167, 172, 180, 185, and 213. Among these examples, at least one selected from the group consisting of C.I. Pigment Yellow 74, 155, and 213 is preferably used.

The pigment used in a white ink is not particularly limited and examples thereof include C.I. Pigment White 6, 18, and 21, titanium oxide, zinc oxide, zinc sulfide, antimony oxide, zirconium oxide, white hollow resin particles, and polymer particles.

Examples of the pigments used in inks other than the above color inks such as a green ink and an orange ink include known pigments in the related art.

Dye

In the embodiment, a dye can be used as the color material. The dye is not particularly limited and acid dyes, direct dyes, reactive dyes, and basic dyes can be used.

The content of the color material is preferably 0.4% by mass to 12% by mass and more preferably 2% by mass to 5% by mass with respect to the total mass of the ink (100% by mass).

Water

The ink composition of the embodiment includes water. Examples of the water include pure water such as ion exchange water, ultrafiltrated water, reverse osmosis water, and distilled water, and water from which ionic impurities are removed as much as possible such as ultrapure water. In addition, when water that has been sterilized by UV irradiation or addition of hydrogen peroxide is used, the development of mold or bacteria can be prevented in a case in which a pigment dispersion liquid and an ink using the same are stored over a long period of time.

The content of the water is not particularly limited and may be appropriately determined as required.

Polymer Particle

The polymer particle has a core-shell structure having a core polymer and a shell polymer, the glass transition temperature of the core polymer is 30° C. or higher and the glass transition temperature of the shell polymer is 50° C. or higher. The glass transition temperature of the shell polymer is more than 10° C. higher than the glass transition temperature of the core polymer and the core polymer includes an aromatic monomer as a constituent unit. When each glass transition temperature of the core polymer and the shell polymer is within the above ranges and the difference in the glass transition temperature between the core polymer and the shell polymer is within the above range, a stable core-shell structure can be formed in the polymer particle.

The core-shell structure refers to a structure in which a core polymer is formed in a void inside a shell polymer. Accordingly, the core-shell structure includes not only a structure in which a shell polymer covers the surface of a core polymer, but also a structure in which a part of a void having a three dimensional network structure inside a shell polymer is filled with a core polymer.

Core Polymer

The glass transition temperature of the core polymer is 30° C. or higher, and preferably 30° C. or higher and 60° C. or lower. In addition, when the glass transition temperature of the core polymer is 30° C. or higher, a stable core-shell structure can be formed and also excellent storage stability of the ink composition tends to be obtained. When the glass transition temperature of the core polymer is 60° C. or lower, the core polymer can be easily issued from the shell polymer after the shell polymer is softened, and thus excellent adhesion can be obtained. Further, from the viewpoint of film formation of the core polymer, it is preferable that the glass transition temperature of the core polymer is lower than the heating temperature of a recording medium after the ink composition is discharged.

The glass transition temperature (hereinafter, also referred to as Tg) is calculated by using an analysis method such as viscoelasticity measurement or a thermal analysis or using a known calculation equation from Tg of a homopolymer of a polymerizable monomer. When the core polymer and the shell polymer, which will be described later, are copolymers, the glass transition temperature (Tg) of each of the copolymers can be calculated from $Tg_n$ of various homopolymers (unit: K) and the mass fractions ($W_n$) of monomers by the following FOX equation:

$$\frac{1}{Tg} = \frac{W_1}{Tg_1} + \frac{W_2}{Tg_2} + \ldots + \frac{W_n}{Tg_n},$$

where $W_n$ represents a mass fraction of each monomer, $Tg_n$ represents Tg of a homopolymer of each monomer (unit: K), and Tg represents Tg of a copolymer (unit: K).

In other words, when the core polymer or the shell polymer is a homopolymer, the glass transition temperature of the core polymer or the shell polymer can be controlled by selecting the homopolymer. In addition, when the core polymer or the shell polymer is a copolymer, the glass transition temperature thereof can be controlled in consideration of Tg of the homopolymer and the above FOX equation.

The core polymer is designed to be a highly hydrophobic polymer. Therefore, it is preferable that the core polymer does not have an acid value. Further, the core polymer includes at least an aromatic monomer as a constituent unit. Thus, the core polymer is hydrophobic and a hydrophobic coating film can be formed. As a result, the water friction resistance which is one of the abrasion resistance properties of a recorded image can be improved.

In addition, the core polymer is not particularly limited and has, as a constituent unit, for example, at least one of a hydrophilic (meth)acrylate monomer, a hydrophobic (meth)acrylate monomer having an alkyl group having 3 or more carbon atoms, a hydrophobic (meth)acrylate monomer having a cyclic structure, a (meth)acrylamide monomer or an N-substituted derivative thereof, and a carboxylic acid monomer unit.

The aromatic monomer is not particularly limited and examples thereof include styrene, α-methylstyrene, p-methylstyrene, vinyl toluene, chlorostyrene, and divinylbenzene.

The hydrophilic (meth)acrylate monomer is not particularly limited and examples thereof include methyl (meth)acrylate, ethyl (meth)acrylate, α-hydroxymethyl (meth)acrylate, 2-hydroxyethyl (meth)acrylate, (poly)ethylene glycol (meth)acrylate, methoxy (poly)ethylene glycol (meth)acrylate, ethoxy (poly)ethylene glycol (meth)acrylate, and (poly)propylene glycol (meth)acrylate. Among these examples, methyl (meth)acrylate and ethyl (meth)acrylate are preferable. Here, the "hydrophilic" monomer refers to a monomer whose solubility is 0.3 g or more with respect to 100 mL of water (20° C.)

The hydrophobic (meth)acrylate monomer having an alkyl group having 3 or more carbon atoms is not particularly limited and examples thereof include (meth)acrylates having an alkyl group having 3 or more carbon atoms, such as n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth)acrylate, lauryl (meth)acrylate, stearyl (meth)acrylate, cetyl (meth)acrylate, neopentyl (meth)acrylate, and behenyl (meth)acrylate. Among these examples, n-butyl (meth)acrylate and isobutyl (meth)acrylate are preferable. Here, the "hydrophobic" monomer refers to a monomer whose solubility is less than 0.3 g with respect to 100 mL of water (20° C.)

The hydrophobic (meth)acrylate monomer having a cyclic structure is not particularly limited and examples thereof include cyclohexyl (meth)acrylate, dicyclopentanyl (meth)acrylate, dicyclopentenyl (meth)acrylate, dicyclopentenyl oxyethyl (meth)acrylate, isobornyl (meth)acrylate, norbornyl (meth)acrylate, adamantyl (meth)acrylate, and tetrahydrofurfuryl (meth)acrylate.

The (meth)acrylamide monomer or the N-substituted derivative thereof is not particularly limited and examples thereof include (meth)acrylamides such as (meth)acrylamide, N-hydroxymethyl (meth)acrylamide, diacetone acrylamide, N,N-dimethylacryl (meth)amide, and N-substituted derivatives thereof.

The carboxylic acid monomer is not particularly limited and examples thereof include (meth)acrylic acid, crotonic acid, maleic acid, fumaric acid, and itaconic acid. Among these examples, (meth)acrylic acid is preferable. Here, the "carboxylic acid monomer unit" refers to a polymerizable monomer unit having a carboxyl group and a polymerizable unsaturated group.

The above monomers may be used singly or in combination of two or more kinds thereof.

The content of the repeating unit derived from the hydrophobic monomer with respect to the total repeating units constituting the resin included in the core polymer is preferably 60% by mass or more, more preferably 75% by mass or more, and still more preferably 90% by mass or more. When the content of the repeating unit derived from the hydrophobic monomer is within the above range, a hydrophobic coating film is formed on the surface of the image recorded onto a recording medium by carrying out a heating treatment or the like and thus the abrasion resistance tends to be further improved.

Shell Polymer

The glass transition temperature of the shell polymer is 50° C. or higher and preferably 50° C. or higher and 150° C. or lower, and the glass transition temperature of the shell polymer is more than 10° C. higher than the glass transition temperature of the core polymer. When the glass transition temperature of the shell polymer is 50° C. or higher and the glass transition temperature of the shell polymer is more than 10° C. higher than the glass transition temperature of the core polymer, a stable core-shell structure can be formed. In addition, since the glass transition temperature of the shell polymer is 50° C. or higher, in a case in which the ink composition is discharged under a high temperature environment, the polymer particles can be discharged from a recording head without causing the collapse of the core-shell type structure and the adhesion of the polymer particles in the nozzles can be further suppressed. Thus, the nozzles can be prevented from being clogged and more excellent intermittent printing stability tends to be obtained. When a film is formed on the recording medium, by heating the ink composition on the recording medium to a temperature higher than the glass transition temperature of the shell polymer, the core polymer is issued from the softened shell polymer and a coating film of the core polymer and the shell polymer is formed on the recording medium. At this time, the softened core polymer adheres to the recording medium while spreading on the recording medium and thus a coating film having excellent fixability is formed. Further, when the glass transition temperature of the shell polymer is 150° C. or lower, the shell polymer on the recording medium is likely to be softened and thus the adhesion tends to become more excellent. On the other hand, when the glass transition temperature of the shell polymer is higher than 150° C., the thermal deformation of the shell polymer is deteriorated and adverse effects such as thickening of the ink may be caused.

Since the shell polymer is hydrophilic, the shell polymer has an acid value and preferably the acid value of the shell polymer is 20 mgKOH/g to 120 mgKOH/g. When the acid value is within the numerical range, a necessary and sufficient degree of hydrophilicity for the shell polymer can be secured.

The shell polymer preferably includes an aromatic monomer as a constituent unit. A curved discharge can be prevented by the shell polymer including an aromatic monomer as a constituent unit although a specific action mechanism is not clear. Particularly, in a case of small dots, the ink droplets are likely to be discharged in a curved manner and thus according to an embodiment of the invention, this curved discharge is suppressed. Accordingly, the ink composition according to the embodiment of the invention is particularly suitable for a head capable of discharging multi-size ink dots from one nozzle. Further, when the shell polymer includes a relatively solid aromatic monomer, the water friction resistance (wet abrasion resistance) of the coating film formed on the recording medium can be improved.

In addition, the shell polymer preferably includes a methyl (meth)acrylate monomer or a (meth)acrylic acid monomer as a constituent unit. By using the methyl (meth) acrylate monomer, the shell polymer can be hydrophilized and the dispersion stability of the polymer particles can be improved. Further, by using the (meth)acrylic acid monomer, a carboxyl group can be present on the surface of the shell polymer. Accordingly, the dispersion stability of the polymer particles is further improved and the viscosity of the ink composition becomes relatively low. Thus, the discharge stability tends to be further improved. The shell polymer may include the (meth)acrylate monomers mentioned in the core polymer section as a constituent unit and examples of such (meth)acrylate monomers include a hydrophilic (meth)acrylate monomer, a hydrophobic (meth)acrylate monomer having an alkyl group having 3 or more carbon atoms, and a hydrophobic (meth)acrylate monomer having a cyclic structure. Specific examples of the (meth) acrylate monomer and the carboxylic acid monomer include the same monomers as the above-described monomers constituting the core polymer and the monomers may be used singly or in combination of two or more kinds thereof.

In the shell polymer, the ratio of the aromatic monomer with respect to the carboxylic acid monomer (aromatic monomer/carboxylic acid monomer) is preferably 0.3 or more and 2 or less, and more preferably 0.5 or more and 1.5 or less. Accordingly, an ink composition having an excellent balance between an improvement in the abrasion resistance by the aromatic monomer and redispersibility by the carboxylic acid monomer can be obtained.

The content of the repeating unit derived from (meth) acrylic acid ester and unsaturated carboxylic acid with respect to the total repeating units constituting the shell polymer is preferably 20% by mass or more, more preferably 30% by mass or more, and still more preferably 35% by mass or more.

The content of the repeating unit derived from the hydrophilic monomer with respect to the total repeating units constituting the shell polymer is preferably 20% by mass or more, more preferably 30% by mass or more, and still more preferably 35% by mass or more. When the content of the repeating unit derived from the hydrophilic monomer is within the above range, the hydrophilicity of the shell polymer is improved and thus the dispersion stability of the polymer particles in the ink composition tends to be improved. In addition, the adhesion of the polymer particles to nozzles can be more effectively suppressed and thus the discharge stability of the ink from the nozzle of the recording head tends to be more satisfactory.

The content of the repeating unit derived from the hydrophobic monomer with respect to the total repeating units constituting the shell polymer is preferably 10% by mass or more, more preferably 20% by mass or more, and still more preferably 30% by mass or more. When the content of the repeating unit derived from the hydrophobic monomer is within the above range, even in a case in which water dries in the recording head and on the recording medium and the occupancy rate of an organic solvent is increased, the dispersion of the polymer particles is stabilized and the aggregation of the polymer particles can be suppressed.

Entirety of Polymer Particles

The aromatic monomers of the core polymer and the shell polymer are respectively included in an amount of 10% by mass or more with respect to the entirety of the polymer particles, and the ratio of the aromatic monomer of the shell polymer with respect to the aromatic monomer of the core polymer (aromatic monomer of shell polymer/aromatic monomer of core polymer) is preferably 0.2 to 2.0. When the content of the relatively solid aromatic monomer is 10% by mass or more and more preferably 10% by mass or more and 80% by mass or less, the water friction resistance (wet abrasion resistance) of the coating film formed on the recording medium can be improved. In addition, when the ratio of the aromatic monomer of the shell polymer with respect to the aromatic monomer of the core polymer (aromatic monomer of shell polymer/aromatic monomer of core polymer) is 0.2 to 2.0, a stable core-shell structure can be formed in the polymer particle.

The average particle size of the polymer particles is preferably 10 nm or more and 100 nm or less. When the average particle size of the polymer particles is relatively small as described above, the gloss of a recorded image is likely to be obtained and the film formation properties are excellent. In addition, when the average particle size of the polymer particles is relatively small, a large mass is less likely to be formed even when the particles are aggregated, and thus nozzle clogging can be suppressed. Further, when the average particle size of the polymer particles is relatively small, the viscosity of the ink composition can be relatively increased and thus even in a case in which the temperature of the ink composition in the recording head is increased, the viscosity of the ink composition can be prevented from being decreased to a degree at which the ink dischargeability is unstable.

The average particle size in the specification refers to a volume-based particle size unless particularly otherwise defined. As for the measurement method, for example, the average particle size can be measured by using a particle size distribution measuring apparatus using a laser diffraction scattering method as the measurement principle. As the particle size distribution measuring apparatus, for example, a particle size distribution meter using a dynamic light scattering method as the measurement principle (for example, Microtrack UPA, manufactured by Nikkiso Co., Ltd.) can be used.

The ratio between the mass of the core polymer and the mass of the shell polymer of the polymer particle preferably satisfies the mass of the core polymer≤the mass of the shell polymer and more preferably satisfies the mass of the core polymer<the mass of the shell polymer. When the mass of the shell polymer is 100%, the mass of the core polymer is preferably 40% to 80%. Accordingly, the balance between the mass of the core polymer and the mass of the shell polymer becomes satisfactory and the fixability of the ink composition is satisfactory, and thus the discharge stability is excellent and a poor vertical alignment is less likely to occur. The poor vertical alignment refers to a phenomenon that the ink around the nozzle is partially solidified due to ink discharged for a long period of time in continuous ink discharge and the discharge direction is curved so that a clear vertical line cannot be printed.

The content (in terms of solid content) of the polymer particles in the ink composition is preferably 0.5% by mass or more and 20% by mass or less, more preferably 0.6% by mass or more and 15% by mass or less, and still more preferably 0.7% by mass or more and 10% by mass or less with respect to the total mass (100% by mass) of the ink composition. When the content of the polymer particles is 0.5% by mass or more, the abrasion resistance and the adhesion tend to become more excellent. In addition, when the content of the polymer particles is 20% by mass or less, the discharge stability tends to become more excellent.

Method for Producing Polymer Particles

A method for producing the above-described polymer particles is not particularly limited and the polymer particles are preferably formed by soap-free polymerization substantially not using an emulsifier. The soap-free polymerization refers to a polymerization method of producing a core-shell polymer substantially without using an emulsifier. The "emulsifier" used herein means a surfactant to be used in synthesis. Further, examples of the soap-free polymerization include a polymerization in which polymer particles are polymerized under the presence of an emulsifier at a content of 1% by mass or less in a solvent. In the related art, the ink composition including such polymer particles obtained by synthesis using an emulsifier has problems in that foam is likely to be generated, the gloss of an image is less likely to be obtained, and foreign substances are likely to be formed. According to the embodiment of the invention, an ink composition in which occurrence of such problems is suppressed can be obtained. In the soap-free polymerization, for example, a shell polymer including (meth)acrylic acid as a constituent unit is formed and then a core is formed in the shell polymer. Further, when the polymer particles are formed by using soap-free polymerization, the average particle size is significantly decreased and thus the discharge stability of the ink composition and glossiness are improved.

The surfactant used in the synthesis is not particularly limited and an anionic surfactant and a nonionic surfactant are suitable. Examples of the anionic surfactant include sodium dodecyl benzene sulfonate, sodium laurylate, and ammonium salts of polyoxyethylene alkyl ether sulfates. Examples of the nonionic surfactant include polyoxyethylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides. The core-shell polymer used in the embodiment is produced without using these surfactants.

The polymerization initiator used in the soap-free polymerization is not particularly limited and hydrophilic initiators are used. Examples thereof include potassium persulfate, ammonium peroxodisulfate, and a hydrogen peroxide solution.

An example of the soap-free polymerization method will be described. However, the synthesis method is not limited to the following examples. For example, ion exchange water and a polymerization initiator are put in a polymerization reaction vessel equipped with a jacket, the pressure inside the polymerization vessel is reduced to remove oxygen. Then, under a nitrogen atmosphere in which the pressure is returned to the atmospheric pressure with nitrogen, first, the temperature inside the polymerization vessel is set to a predetermined temperature and then polymerization reaction is carried out by adding a pre-emulsion solution including the monomer which becomes a constituent element of the shell polymer dropwise by a fixed amount to synthesis a shell polymer. Next, the void of the obtained shell polymer is used as a polymerization site to polymerize a core polymer, and thus a polymer particle according to the embodiment is synthesized. Specifically, a monomer mixture including the above-described hydrophobic monomer is added dropwise into an aqueous dispersion medium containing the shell polymer, and the core polymer is synthesized to form a polymer particle. When the shell polymer is used as a site for the polymerization of the core polymer as described above, it is not necessary to use an emulsifier in the monomer mixture.

According to the soap-free polymerization, the content of the emulsifier in the ink composition can be easily set to 0.01% by mass or less and the average particle size of the polymer particles can be minimized.

Wax Particle

The ink composition of the embodiment may include wax particles having a melting point of 70° C. or higher and lower than 110° C. When the recording head is heated, the polymer particles are aggregated and fixed with the evaporation of moisture to cause clogging of nozzles of the recording head and thus stable discharge may be disturbed. Contrarily, when the was particles having the above-described melting point is used together, the aggregation of the polymer particles during the moisture evaporation is suppressed. Thus, poor discharge and clogging due to fixation of the polymer particles to the nozzles of the recording head can be suppressed and further an ink composition having excellent recording stability is obtained. In addition, the wax particle has a function of preventing the coating film formed by the polymer particles from being brittle during high temperature recording. Therefore, an ink composition in which the abrasion resistance is less likely to deteriorate even when recording is carried out at a high temperature is obtained.

The melting point of the wax particle is 70° C. or higher and lower than 110° C. and preferably 80° C. or higher and lower than 110° C. When the melting point is within the above range, a recorded matter in which the recording stability is more excellent and the abrasion resistance is much less likely to deteriorate during high temperature recording can be obtained. The melting point can be measured by a differential scanning calorimeter (DSC). In addition, the melting point of the wax particle can be controlled by, for example, adjusting the ratio among the plural constituent units constituting the was particle.

The wax particles include polyethylene wax particles. The polyethylene wax particles having a melting point of 70° C. or higher and lower than 110° C. are not particularly limited and examples thereof include AQUACER 593 polyolefine wax (manufactured by BYK), NOPCOTE PEM-17 (manufactured by SAN NOPCO Ltd.), POLYLON L787 and POLYLON L788 (all manufactured by CHUKYO YUSHI CO., LTD.), and CHEMIPEARL W4005 (manufactured by Mitsui Chemicals, Inc.). The polyethylene wax particles having a melting point of 70° C. or higher and lower than 110° C. may be particles synthesized by a usual method.

The wax particles may be used singly or in combination of two or more kinds thereof.

The amount of the wax particles added into the ink composition is preferably 0.1% by mass to 2.5% by mass and more preferably 0.2% by mass to 2.0% by mass with respect to the total mass of the ink composition in terms of wax solid content. When the amount of the wax particles added is within the above range, the recording stability is more excellent and the abrasion resistance is much less likely to deteriorate even during high temperature recording.

The average particle size of the wax particles is preferably 0.02 µm to 0.5 µm and more preferably 0.04 µm to 0.3 µm. When the average particle size is within the above range, the recording stability is more excellent and the abrasion resistance is much less likely to deteriorate even during high temperature recording. The average particle size can be measured by using the same method as described in the measurement of the polymer particle size.

Organic Solvent

The ink composition of the embodiment may include various organic solvents. The ink composition of the embodiment preferably include an alkyl polyol having a standard boiling point of 150° C. or higher and 250° C. or lower and an SP value of 10 $(cal/cm^3)^{1/2}$ or more and 15 $(cal/cm^3)^{1/2}$ or less based on a Hansen method. The organic solvent having a standard boiling point of 150° C. to 250° C. enables the ink to be fixed to a recording medium by heating the ink on a non-absorbent or low absorbent recording medium.

The alkyl polyol satisfying the above requirements is not particularly limited and examples thereof include propylene glycol, 1,3-propanediol, 1,2-butanediol, 1,3-butanediol, 1,4-butanediol, 1,2-pentanediol, 1,5-pentanediol, 1,2-hexanediol, and 1,6-hexanediol. Among these examples, an alkyl polyol having 5 or more carbon atoms is particularly preferable. For example, 1,2-butanediol and 1,3-butanediol are preferable. The alkyl polyol having 5 or more carbon atoms is highly hydrophobic. Therefore, even in a state in which water evaporates by heating the recording head and the concentration of the organic solvent is increased, the alkyl polyol can be stably present and thus clogging in a short period of time can be suppressed and the intermittent discharge properties can be improved.

The content of the alkyl polyol having an SP value of 10 $(cal/cm^3)^{1/2}$ or more and 15 $(cal/cm^3)^{1/2}$ or less is 1% by mass or more and 30% by mass or less and more preferably 2% by mass or more and 20% by mass or less. When the SP value is within a range of 10 $(cal/cm^3)^{1/2}$ or more and 15 $(cal/cm^3)^{1/2}$ or less, the solvent has high compatibility with the polymer particles having hydrophilic functional groups on the outer side and the polymer particles can be satisfactorily dispersed. Particularly, the solvent has high compatibility with the polymer particles provided with carboxyl groups. Therefore, the intermittent discharge performance can be improved and dot missing can be prevented.

Here, the solubility parameter (SP value) will be described. In the specification, the SP value is an SP value based on a Hansen method. In the Hansen method, an SP value $\delta$ is classified into three terms and calculated by an equation: $\delta^2 = \delta_d^2 + \delta_p^2 + \delta_h^2$. $\delta_d$, $\delta_p$, and $\delta_h$ are solubility parameters respectively correspond to a dispersion force term, a dipole-dipole force term, and a hydrogen bonding force term. The values of SP values of each solvent based on the Hansen method are as shown in Table 1.

TABLE 1

| | Hansen SP value $(cal/cm^3)^{1/2}$ |
|---|---|
| Water | 23.9 |
| Triethylene amine | 18.33 |
| Glycerin | 18.08 |
| Trimethyl phosphate | 16.74 |
| Ethylene glycol | 16.48 |
| Polyethylene glycol | 15.11 |
| Methanol | 14.84 |
| 1,3-Butanediol | 14.47 |
| Diethylene glycol | 14.21 |
| 2-Pyrrolidinone | 14.2 |
| Triethyl glycol | 13.77 |
| 1,2-Butanediol | 13.46 |
| Dimethyl sulfoxide | 13.34 |
| Tripropanol amine | 13.21 |
| 1,6-Hexanediol | 13.19 |
| 3-Methyl-1,3-butanediol | 13.12 |
| Dipropylene glycol | 12.89 |
| Ethanol | 12.73 |
| Tetraethylene glycol | 12.56 |
| Nitromethane | 12.54 |
| 1,2-Hexanediol | 12.48 |
| Dimethylform amide | 12.43 |
| 1-(2-Hydroxyethyl)-2-pyrrolidone | 12.04 |
| 2-Propanol | 11.79 |
| 2-Ethyl-1,3-hexanediol | 11.59 |

The content of the above-described alkyl polyol is not particularly limited and is preferably 5.0% by mass to 35% by mass and more preferably 5% by mass to 20% by mass with respect to the total amount of the ink composition.

Cyclic Nitrogen Compound and Non-Proton Type Polar Solvent

The ink composition of the embodiment may further include at least one of a cyclic nitrogen compound and a non-proton type polar solvent. When the ink composition includes a cyclic nitrogen compound and a non-proton type polar solvent, the apparent glass transition temperature of the polymer particle can be shifted to a low temperature side, and the core polymer and the shell polymer can be cured at a lower temperature than in the related art. Thus, the fixability of the ink composition to a recording medium can be improved. Accordingly, particularly, when the recording medium is made of polyvinyl chloride, the fixability of the ink composition to the recording medium can be improved.

The non-proton type polar solvent is not particularly limited and examples thereof include a cyclic ketone compound, a chain ketone compound, and a chain nitrogen compound. In addition, representative examples of the cyclic nitrogen compound and the non-proton type polar solvent include pyrrolidones, imidazolidinones, sulfoxides, lactones, and amide ethers. Among these examples, 2-pyrrolidone, N-alkyl-2-pyrrolidone, 1-alkyl-2-pyrrolidone, γ-butyrolactone, 1,3-dimethyl-2-imidazolidinone, dimethyl sulfoxide, imidazole, 1-methylimidazole, 2-methylimidazole, 1,2-dimethylimidazole, and alkoxypropionamide are preferable. 2-pyrrolidone and alkoxypropionamide are more preferable.

The content of the cyclic nitrogen compound and the non-proton type polar solvent is not particularly limited and is preferably 5.0% by mass to 35% by mass and more preferably 5% by mass to 20% by mass with respect to the total amount of the ink composition.

Other Solvents

The ink according to the embodiment may further include solvents other than the above-described solvents. Solvents other than the above-described solvents are not particularly limited and specific examples thereof include alcohols and glycols such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol. The other solvents may be used singly or in combination of two or more kinds thereof.

The boiling point of the other solvents is preferably 140° C. to 280° C., more preferably 160° C. to 260° C., and still more preferably 180° C. to 240° C. When the boiling point of the other solvents is within the above range, the intermittent properties tend to be further improved.

The content of the other solvents is preferably 5.0% by mass to 25% by mass and more preferably 10% by mass to 20% by mass with respect to the total amount of the ink.

Alkyl Polyol Having Standard Boiling Point of 280° C. or Higher

The ink composition of the embodiment does not substantially include an alkyl polyol having a standard boiling point of 280° C. or higher. When the ink composition substantially includes an alkyl polyol having a standard boiling point of 280° C. or higher, the drying properties of the ink are significantly decreased. As a result, in various recording mediums, particularly, in a non-ink-absorbent or low absorbent recording medium, uneven image density is noticeable and also the fixability of the ink cannot be obtained.

Here, the description of "does not substantially include" means that a predetermined substance is not added with an amount larger than such an amount that the meaning of adding the substance is sufficiently demonstrated. The content of the alkyl polyol having a standard boiling point 280° C. or higher in the ink composition is preferably 0% by mass or more and lower than 1.0% by mass, more preferably 0% by mass or more and lower than 0.5% by mass, still more preferably 0% by mass or more and lower than 0.1% by mass, yet still more preferably 0% by mass or more and lower than 0.05% by mass, even yet still more preferably 0% by mass or more and lower than 0.01% by mass, and most preferably 0% by mass or more and lower than 0.001% by mass with respect to the total mass of the ink composition.

When the content is within the above range, a reduction in abrasion resistance of a recorded matter obtained using the ink composition caused by the alkyl polyol having a standard boiling point of 280° C. or higher is suppressed, so that a recorded matter having more excellent abrasion resistance can be obtained.

Surfactant

It is preferable that the ink composition of the embodiment further includes a surfactant. The surfactant is not particularly limited and examples thereof include an acetylene glycol-based surfactant, a fluorine-based surfactant, and a silicone-based surfactant. When the ink composition includes these surfactants, more satisfactory drying properties of the ink composition adhering onto a recording medium are obtained and high speed printing can be carried out.

Among these examples, since the solubility in the ink composition is increased and foreign substances are much less likely to be formed in the ink composition, a silicone-based surfactant is more preferable.

The acetylene glycol-based surfactant is not particularly limited and for example, at least one selected from 2,4,7,9-tetramethyl-5-decyne-4,7-diol and alkylene oxide adducts of 2,4,7,9-tetramethyl-5-decyne-4,7-diol, and 2,4-dimethyl-5-decyne-4-ol and alkylene oxide adducts of 2,4-dimethyl-5-decyne-4-ol are preferably used. A commercially available acetylene glycol-based surfactant is not particularly limited and examples thereof include E series such as Olfine 104 series and Olfine E1010 (product names, manufactured by Air Products Japan, Inc.), and Surfynol 465, Surfynol 61 and Surfynol DF110D (product names, manufactured by Nissin Chemical Industry CO., Ltd.). The acetylene glycol-based surfactants may be used singly or in combination of two or more kinds thereof.

The fluorine-based surfactant is not particularly limited and examples thereof include perfluoroalkylsulfonate, perfluoroalkylcarboxylate, perfluoroalkyl phosphoric acid ester, a perfluoroalkyl ethylene oxide adduct, perfluoroalkyl betaine, and a perfluoroalkyl amine oxide compound. A commercially available fluorine-based surfactant is not particularly limited and the examples thereof include S-144, S-145 (manufactured by ASAHI GLASS CO., LTD.); FC-170C, FC-430, and Fluorad-FC4430 (manufactured by Sumitomo 3M Limited); FSO, FSO-100, FSN, FSN-100, and FS-300 (manufactured by DuPont); and FT-250 and 251 (manufactured by NEOS COMPANY LIMITED). The fluorine-based surfactants may be used singly or in combination of two or more kinds thereof.

Examples of the silicone-based surfactant include polysiloxane compounds and polyether modified organosiloxane. A commercially available silicone-based surfactant is not particularly limited and specific examples thereof include BYK-306, BYK-307, BYK-333, BYK-341, BYK-345, BYK-346, BYK-347, BYK-348, and BYK-349 (all product names, manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all product names, manufactured by Shin-Etsu Chemicals Co., Ltd.).

The content of the surfactant is preferably 0.1% by mass to 5% by mass and more preferably 0.1% by mass to 3.0% by mass with respect to the total amount of the ink composition. When the content of the surfactant is within the above range, the wettability of the ink composition adhering onto a recording medium tends to be further improved.

pH Adjusting Agent

The ink of the embodiment may include a pH adjusting agent. Examples of the pH adjusting agent include inorganic alkalis such as sodium hydroxide and potassium hydroxide, ammonia, diethanolamine, triethanolamine, triisopropanolamine, morpholine, potassium dihydrogen phosphate, disodium hydrogen phosphate, and sodium ethylenediamine tetraacetate.

The pH adjusting agents may be used singly or in combination of two or more kinds thereof. The content of the pH adjusting agent is not particularly limited and may be determined appropriately as required.

Other Components

In addition to the above-described components, various additives such as a dissolution aid, a viscosity modifier, an antioxidant, a preservative, an antifungal agent, an antifoaming agent, and a corrosion inhibitor can be appropriately added to the ink of the embodiment.

It is preferable that the ink composition of the embodiment is recorded on a recording medium to be heated. An image having excellent abrasion resistance can be formed by applying the ink composition to the heated recording medium as described above. In addition, when the recording medium is heated, the head is heated by the radiant heat. According to the ink composition of the embodiment, nozzle clogging can be suppressed even when the head is heated and the discharge stability can be improved. The heating temperature is preferably 35° C. or higher, more preferably 40° C. or higher and 110° C. or lower, and still more preferably 45° C. or higher and 120° C. or lower.

For example, platen heater or an infrared radiation may be used to heat the recording medium. In addition, it is preferable that the ink composition of the embodiment is an ink composition used in an ink jet recording method from the viewpoint of effectively and reliably exhibiting the action effect of the invention.

Method for Producing Ink

The ink of the embodiment can be obtained by mixing the above-described components (materials) in an arbitrary order, filtering the mixture as required, and removing impurities. Here, when the pigment is prepared in a state in which the pigment is uniformly dispersed in the solvent in advance and then mixed, the handling of the pigment is easy and thus the preparation of the pigment is preferable.

As a method for mixing each material, a method of sequentially putting the materials into a vessel equipped with a stirring apparatus such as a mechanical stirrer and a magnetic stirrer and stirring and mixing the materials can be suitably used. As a filtration method, for example, centrifugal filtration or filter filtration can be carried out as required.

Recording Medium

The recording medium is an absorbent or low absorbent recording medium or a non-absorbent recording medium. As the recording medium, a low absorbent recording medium or a non-absorbent recording medium is preferable and a non-absorbent recording medium is more preferable. As for the recording medium, a heated recording medium is preferably used. Due to the fact that recording is carried out using the ink composition of the embodiment by causing the ink composition to adhere onto the heated recording medium, when the ink composition adheres onto the recording medium, the shell polymer is softened and thus a coating film having excellent abrasion resistance can be formed. In addition, since it is preferable that the recording medium is heated, the nozzles may not be heated excessively to decrease the viscosity of the ink composition. Accordingly, a component such as resin in the ink composition can be prevented from being melt and adhering to the inner wall of the nozzles and the clogging recovery properties are excellent. During the heating, the surface temperature of the recording medium is preferably 30° C. to 60° C. and more preferably 40° C. to 60°. The "heating temperature" of the recording medium refers to a temperature obtained by measuring the surface temperature of the recording medium.

The absorbent recording medium is not particularly limited and a recording medium having high absorbing performance such as cloth particularly is preferable. The cloth is not limited to the following and examples thereof include natural fibers and synthetic fibers such as silk, wool, nylon, polyester, and rayon.

The low absorbent recording medium is not particularly limited and examples thereof include coating paper provided with a coating layer on the surface for receiving an oil-based ink composition. The coating paper is not particularly limited and examples thereof include printing paper, such as art paper, coated paper, and mat paper.

The non-absorbent recording medium is not particularly limited and examples thereof include films or plates of plastics such as polyvinyl chloride, polyethylene, polypropylene, and polyethylene terephthalate (PET), plates of metals such as iron, silver, copper, and aluminum, or metal plates produced by vapor deposition of the various metals, plastic films, and plates of alloys such as stainless and brass. Further, it is preferable that an ink absorption layer composed of silica particles or alumina particles, or an ink absorption layer composed of a hydrophilic polymer such as polyvinyl alcohol (PVA) or polyvinyl pyrrolidone (PVP) is not formed in the non-absorbent recording medium.

Herein, the "low absorbent recording medium" or the "non-absorbent recording medium" in this description refers to a recording medium in which the water absorption amount from the initiation of contact to 30 msec is 10 mL/m$^2$ or lower in the Bristow method. This Bristow method is the most spread method as a method for measuring the liquid absorption amount in a short period of time and is employed also in the Japan Technical Association of the Pulp and Paper Industry (JAPAN TAPPI). The details of the test method are described in "Liquid Absorbency Test Method of Paper and Paperboard (Bristow Method)" of No. 51 of "JAPAN TAPPI paper pulp test method, 2000".

In addition, the non-absorbent recording medium or the low absorbent recording medium can be classified according to the wettability with respect to water on the recording surface. For example, the recording medium can be characterized by adding a 0.5 μL of water droplets onto the recording surface of the recording medium and measuring the rate of decrease of the contact angle (comparison of the contact angle at 0.5 milliseconds after landing and the contact angle at 5 seconds after landing). More specifically, as the properties of the recording medium, the term non-absorbent of the "non-absorbent recording medium" indicates that the above-described rate of decrease is less than 1% and the term low absorbent of the "low absorbent recording medium" indicates that the above-described rate of decrease is 1% or more and less than 5%. Further, the term absorbent indicates that the above-described rate of decrease is 5% or more. The contact angle can be measured by using a portable contact angle meter PCA-1 (manufactured by Kyowa Kaimen Kagaku) or the like.

Recording Method

The recording method of the embodiment has a heating process of heating a recording medium, and a discharge process of discharging the ink composition from nozzles and causing the ink composition to adhere onto the recording medium.

Heating Method

It is preferable that the recording medium is heated when or after the ink composition of the embodiment is discharged onto the recording medium. By heating the recording medium as described above, an image in which image bleeding is prevented and the abrasion resistance is excellent can be formed. Further, when recording is carried out on the heated recording medium by using the ink composition of the embodiment ink composition, in a case in which the ink composition adheres to the recording medium, the shell polymer is softened and the core polymer is issued and thus a coating film having more excellent abrasion resistance can be formed.

When the ink composition is discharged, in a case in which the recording medium is heated, the head is heated due to the radiant heat. However, according to the ink composition of the embodiment, nozzle clogging can be suppressed even when the recording head is heated and the discharge stability can be improved. The heating temperature when the ink composition is discharged is preferably 30° C. to 60° C. and more preferably 40° C. to 60° C. In addition, in a case in which the recording medium is heated after the ink composition is discharged, it is preferable that the recording medium is heated at a temperature higher than the heating temperature of the recording medium when the ink composition is discharged. The heating temperature is preferably 60° C. or higher, more preferably 70° C. or higher and 120° C. or lower, and even still more preferably 70° C. or higher and 110° C. or lower.

Discharge Process

The discharge process is a process of discharging the ink composition from nozzles and causing the ink composition to adhere onto the recording medium. As for a discharge unit (recording head) of the ink composition, a known method of the related art can be used and a method of discharging liquid droplets by using vibration of a piezoelectric element, that is, a method of forming ink droplets by mechanical deformation of an electrostrictive element can be used.

When the method has the heating process and the discharge process, the shell polymer of the polymer particle in the ink composition is not softened in the recording head and the polymer particle can be prevented from being melt and adhering to the inside of the recording head. Accordingly, the discharge stability is improved.

Drying Process

The recording method of the embodiment may have a drying process of drying the ink composition. A drying unit is not particularly limited and examples thereof include units such as heater, a hot air mechanism, and a thermostatic tank (not shown). When the drying unit heats the recording medium on which an image is recorded, moisture included in the ink composition or the like more rapidly evaporates and scatters and thus a coating film is formed by the polymer particles included in the ink composition. In this manner, the dried ink is firmly fixed (adheres) onto the recording medium and a high-definition image having excellent abrasion resistance can be obtained in a short period of time.

Recording Apparatus

A recording apparatus according to this embodiment includes a recording head that discharges the ink composition to a recording medium, a heating unit that heats the recording medium, and a drying unit that dries the ink composition for ink jet adhering to the recording medium. The recording apparatus may further include the above-described ink composition for ink jet.

FIG. 1 is a schematic cross-sectional view showing an recording apparatus according to this embodiment. As shown in FIG. 1, a recording apparatus 1 includes a recording head 2, an IR heater 3, a platen heater 4, a curing heater 5, a cooling fan 6, a pre-heater 7, and a ventilation fan 8.

The recording head 2 discharges the ink composition to the recording medium. As for the recording head 2, a known method of the related art can be used. As an example of the known method, a method of discharging liquid droplets by using vibration of a piezoelectric element, that is, a method of forming ink droplets by mechanical deformation of an electrostrictive element can be used. For example, the recording head 2 can discharge multi-size dots of the ink composition from one nozzle.

The recording medium heating unit heats the recording medium when the ink composition is discharged from the recording head 2. The recording medium heating unit is not particularly limited and examples thereof include a unit that directly heats the recording head 2 by hot air or the IR heater 3, and a unit that heats the recording head 2 through the recording medium heated by the platen heater 4.

When the IR heater 3 is used, the recording medium can be heated from the side of the recording head 2. Accordingly, the recording head 2 is likely to be heated at the same time. However, compared to a case in which the recording medium is heated from the rear surface by the platen heater 4, the temperature can be increased without being affected by the thickness of the recording medium. Further, when the platen heater 4 is used, the recording medium can be heated from the opposite side of the recording head 2. Accordingly, the recording head 2 is relatively less likely to be heated.

It is preferable that the recording apparatus 1 further include a recording medium heating unit that heats the recording medium when the ink composition is discharged to the recording medium so that the surface temperature of the recording medium is 35° C. or higher. A more preferable temperature is 30° C. or higher and 60° C. or lower. The recording medium heating unit is not particularly limited and examples thereof include the IR heater 3, and the platen heater 4. When the recording medium heating unit is provided, the ink composition adhering onto the recording medium can be more rapidly dried and thus bleeding can be further suppressed.

The drying unit heats and dries the recording medium to which the ink composition for ink jet adheres. The drying unit is not particularly limited and examples thereof include units such as the curing heater 5, a hot air mechanism (not shown), and a thermostatic tank (not shown). When the drying unit dries the recording medium on which an image is recorded, moisture included in the ink composition or the like more rapidly evaporates and scatters and thus a coating film is formed by the polymer particles included in the ink composition. In this manner, the dried ink is firmly fixed (adheres) onto the recording medium, and thus a high-definition image having excellent abrasion resistance can be formed in a short period of time. The heating temperature of the drying unit is preferably higher than the heating temperature of the recording medium heating unit, more preferably 70° C. or higher, and still more preferably 70° C. or higher and 110° C. or lower.

The above-described expression "heating the recording medium" means that the temperature of the recording medium is increased to a predetermined temperature, and is not limited to direct heating of the recording medium.

The recording apparatus 1 may include the cooling fan 6. After drying, the ink composition on the recording medium is cooled by the cooling fan 6 and thus a coating film with good adhesion can be formed on the recording medium.

In addition, the recording apparatus 1 may include the pre-heater 7 that heats (pre-heats) the recording medium in advance before the ink composition is discharged to the recording medium. Further, the recording apparatus 1 may include the ventilation fan 8 so that the ink composition adhering onto the recording medium is more effectively dried.

EXAMPLES

Hereinafter, examples of the above-described ink composition according to the embodiment of the invention will be described. However, the invention is not limited thereto.

Preparation of Ink Composition

Each material was mixed at the following composition (% by mass) shown in Table 2 and sufficiently stirred to obtain ink compositions of Examples 1 to 10 and Comparative Examples 1 to 4.

TABLE 2

| | | Example 1 | Example 2 | Example 3 | Example 4 | Example 5 | Example 6 | Example 7 | Example 8 |
|---|---|---|---|---|---|---|---|---|---|
| Color material | C.I. Pigment Blue 15:3 | 4 | 4 | 4 | 4 | 4 | 4 | 4 | 4 |
| Dispersion resin | Styrene-acrylic acid copolymer | 1 | 1 | 1 | 1 | 1 | 1 | 1 | 1 |
| Solvent | 1,2-Hexanediol | 5 | 5 | 5 | 5 | 5 | 1 | 1 | 1 |
| | Propylene glycol | 5 | 5 | 5 | 5 | 5 | | | |
| | 2-pyrrolidone | 10 | 10 | 10 | 10 | 10 | 10 | 10 | 10 |
| | 1,2-Butanediol | | | | | | 3 | 3 | 3 |
| | 1,3-butylene glycol | | | | | | 5 | 5 | 5 |
| Binder resin | Polymer particle (*) | 3 | 3 | 3 | 3 | 3 | 3 | 3 | 3 |
| | Styrene-acrylic acid copolymer resin emulsion PEM-17 | | | | | | | | |
| | CHEMIPEARL W4005 | 0.5 | 0.5 | 0.5 | 0.5 | 0.5 | 0.5 | 0.5 | 0.5 |
| | Pure water | Remainder | Remainder | Remainder | Remainder | Remainder | Remainder | Remainder | Remainder |
| Evaluation results | Abrasion resistance/Fixability | A | A | A | A | A | A | A | A |
| | Redissolubility | A | A | A | A | A | A | A | A |
| | Print quality (aggregation) | A | A | A | A | A | A | A | A |

| | | Example 9 | Example 10 | Comparative Example 1 | Comparative Example 2 | Comparative Example 3 | Comparative Example 4 |
|---|---|---|---|---|---|---|---|
| Color material | C.I. Pigment Blue 15:3 | 4 | 4 | 4 | 4 | 4 | 4 |
| Dispersion resin | Styrene-acrylic acid copolymer | 1 | 1 | 1 | 1 | 1 | 1 |
| Solvent | 1,2-Hexanediol | 1 | 1 | 5 | 5 | 5 | 5 |
| | Propylene glycol | | | 5 | 5 | 5 | 5 |
| | 2-pyrrolidone | 10 | 10 | 10 | 10 | 10 | 10 |
| | 1,2-Butanediol | 3 | 3 | | | | |
| | 1,3-butylene glycol | 5 | 5 | | | | |
| Binder resin | Polymer particle (*) | 3 | 3 | | 3 | 3 | 3 |
| | Styrene-acrylic acid copolymer resin emulsion PEM-17 | | | 3 | | | |
| | CHEMIPEARL W4005 | 0.5 | 0.5 | 1 | 0.5 | 0.5 | 0.5 |
| | Pure water | Remainder | Remainder | Remainder | Remainder | Remainder | Remainder |
| Evaluation results | Abrasion resistance/Fixability | A | A | A | B | A | B |
| | Redissolubility | A | A | C | B | C | B |
| | Print quality (aggregation) | A | A | B | B | B | B |

Among the ink components shown in Table 2, an additional description for product names is as follows.

Binder Resin

A styrene-acrylic acid copolymer resin emulsion (having a Tg of 85° C. and an average particle size of 140 nm) PEM-17 (manufactured by SAN NOPCO Ltd.)

CHEMIPEARL W4005 (product name, manufactured by Mitsui Chemicals, Inc.)

Regarding Polymer Particle

The details of polymer particles used in Examples 1 to 10 and Comparative Examples 2 to 4 shown in Table 2 will be described in Table 3 and the Tg of the shell polymer, the components of the shell polymer, the Tg of the core polymer, represents a coefficient (1), and SIZE represents the amount of a sample (g), respectively.

TABLE 3

| (*) Polymer particle | | Example 1 | Example 2 | Example 3 | Example 4 | Example 5 | Example 6 | Example 7 | Example 8 |
|---|---|---|---|---|---|---|---|---|---|
| Shell polymer Tg | | 75 | 74 | 91 | 70 | 74 | 75 | 74 | 91 |
| Component of shell polymer | MMA | 35 | 18 | 42 | 32 | 42 | 35 | 18 | 42 |
| | ST | 40 | 60 | 40 | 40 | 40 | 40 | 60 | 40 |
| | AA | 15 | 12 | 8 | 8 | 8 | 15 | 12 | 8 |
| | LMA | 10 | 10 | | 10 | | 10 | 10 | |
| | | | | MA 10 | HEMA 10 | | | | MA 10 |
| Core polymer Tg | | 41 | 41 | 32 | 41 | 41 | 41 | 41 | 32 |
| Component of core polymer | BA | 27 | 27 | 32 | 27 | 27 | 27 | 27 | 32 |
| | ST | 73 | 73 | 68 | 73 | 73 | 73 | 73 | 68 |
| | MMA | | | | | | | | |
| | EA | | | | | | | | |
| | EHA | | | | | | | | |
| Shell ratio | | 54 | 54 | 54 | 54 | 54 | 54 | 54 | 54 |
| ΔTgIS-CI | | 34 | 33 | 59 | 29 | 33 | 34 | 33 | 59 |
| Average partic lesize | | 18 | 20 | 22 | 20 | 25 | 18 | 20 | 22 |
| Shell aromatic monomer/core aromatic monomer | | 0.55 | 0.82 | 0.59 | 0.55 | 0.55 | 0.55 | 0.82 | 0.59 |

| (*) Polymer particle | | Example 9 | Example 10 | Comparative Example 1 | Comparative Example 2 | Comparative Example 3 | Comparative Example 4 |
|---|---|---|---|---|---|---|---|
| Shell polymer Tg | | 70 | 74 | — | 15 | 70 | 40 |
| Component of shell polymer | MMA | 32 | 42 | — | — | | 65 |
| | ST | 40 | 40 | — | 70 | 80 | |
| | AA | 8 | 8 | — | — | | 10 |
| | LMA | 10 | | — | — | | 25 |
| | | HEMA 10 | | — | EHA 30 | EA 20 | |
| Core polymer Tg | | 41 | 41 | — | 6 | 15 | 30 |
| Component of core polymer | BA | 27 | 27 | — | | | 20 |
| | ST | 73 | 73 | — | | 70 | 40 |
| | MMA | | | — | 30 | | |
| | EA | | | — | 70 | | |
| | EHA | | | — | | 30 | |
| Shell ratio | | 54 | 54 | — | 40 | 50 | 50 |
| ΔTgIS-CI | | 29 | 33 | — | 9 | 55 | 10 |
| Average partic lesize | | 20 | 25 | | 165 | 128 | 80 |
| Shell aromatic monomer/core aromatic monomer | | 0.55 | 0.55 | | | 1.14 | | the shell ratio, and the average particle size of each polymer particle will be described. The shell ratio refers to a ratio of the monomer weight when the shell polymer is produced to a total weight of the monomer weight when the core polymer is produced and the monomer weight when the shell polymer is produced. The Tg of the core polymer and the shell polymer was calculated using the above-described FOX equation. In addition, the particle size φ (nm) of the polymer particles was obtained by measuring the above obtained polymer particles using a Microtrack UPA (manufactured by Nikkiso Co., Ltd.). The core polymers of the polymer particles in Examples 1 to 9 did not have acid values.

The acid value of each polymer particle was measured using AT 610, manufactured by Kyoto Electronics Manufacturing Co., Ltd., and the measured values were applied to the following Equation (1) to calculate the acid value.

$$\text{Acid value (mg/g)} = (EP1-BL1) \times FA1 \times C1 \times K1/\text{SIZE} \quad (1)$$

In the above equation, EP1 represents a titration amount (mL), BL1 represents a blank value (0.0 mL), FA1 represents a factor of titrant (1.00), C1 represents a concentration conversion value (5.611 mg/mL) (amount corresponding to 1 mL KOH having a concentration of 0.1 mol/L), K1

In Table 3, the official name of the abbreviations of the components of the shell polymer and the core polymer are as follows.
ST: Styrene
MMA: Methyl methacrylate
LMA: Lauryl methacrylate
AA: Acrylic acid
BA: n-Butyl acrylate
EA: Ethylacrylate
EHA: 2-Ethylhexyl acrylate
MA: Methylacrylate
HEMA: Hydroxymethyl methacrylate A method for preparing the polymer particles shown in Table 3 will be described.

100 Parts of ion exchange water was put into a reaction vessel equipped with a dropping apparatus, a thermometer, water-cooled reflux condenser, and a stirrer, and 0.2 parts of ammonium peroxodisulfate, as a polymerization initiator, was added under stirring at a temperature of 70° C. and under a nitrogen atmosphere. A monomer solution into which 40 parts of styrene, 34.6 parts of methyl methacrylate, 10 parts of lauryl methacrylate, and 15.4 parts of acrylic acid were added was added dropwise into the reaction vessel and subjected to a reaction to prepare a shell polymer by polymerization. Then, a liquid mixture of 0.2 parts of potassium persulfate, 73 parts of styrene, and 27 parts of n-butyl acrylate was added dropwise under stirring at a temperature of 70° C. and subjected to a polymerization reaction. Thereafter, the polymerization reaction product was neutralized with sodium hydroxide to adjust the pH to 8 to 8.5, then filtered with a 0.3 μm filter to obtain a polymer particle dispersion liquid of Example 1.

The polymer particles used in Examples 2 to 10 and Comparative Examples 2 to 4 were prepared in the same manner as in Example 1 except that the ratio of the components of the shell and core was changed.

The thus obtained ink compositions of Examples 1 to 10 and Comparative Examples 1 to 4 were evaluated as follows.

Abrasion Resistance Evaluation

An ink jet printer PX-G-930 was filled with each of the inks obtained in Examples and Comparative Examples, a 100% duty pattern was printed onto a soft vinyl chloride film (Scotchcal Film; manufactured by Sumitomo 3M Limited) which was not subjected to an ink jet print dedicated surface treatment. The print sample was prepared by drying the sample in a thermostatic tank at 60° C. and a relative humidity of 20% for 1 hour and further drying the sample at room temperature for 1 day. Using a Gakushin-type rubbing fastness tester (AB-01 RUBBING TESTER, manufactured by TESTER SANGYO CO., LTD., at a load of 500 g), a recorded matter was rubbed 50 times with a Kanakin #3 and was visually observed whether a scratch or peeling was generated on the recording surface. The evaluation criteria were as follows. The evaluation results are also shown in Table 2.

A: Peeling of the printed surface was rarely observed or slight peeling was observed but not remarkable.
B: The scratch of 0.5 mm or more and peeling were observed on the printed surface.

Redissolubility Evaluation 5 g of the prepared ink was put in a 30 ml glass bottle and was left to stand under the environment of at 50° C. for 3 hours in an uncovered state. 10 g of pure water was added to an ink solid after being left to stand and was left to stand for 30 minutes. Thereafter, the state change was visually observed and the ink redissolubility was determined according to the following evaluation criteria. The evaluation results are shown in Table 2.

A: The ink solid was redissolved and had a uniform state.
B: Although some of the ink solid was redissolved, the solid remained on the wall surface of the bottle.
C: The ink solid was rarely dissolved.

Print Quality Evaluation

An ink jet printer PX-G-930 was filled with each of the inks obtained in Examples and Comparative Examples, and a pattern was printed onto a soft vinyl chloride film (Scotchcal Film; manufactured by Sumitomo 3M Limited) which was not subjected to an ink jet print dedicated surface treatment. The print sample was prepared by drying the sample in a thermostatic tank at 60° C. and a relative humidity of 20% for 1 hour and further drying the sample at room temperature for 1 day. The image was recorded under the condition of a resolution of vertical 720 dpi×horizontal 720 dpi, the amount of print ink of 1.0 mg/cm$^2$, and a Duty of 10% to 100% (changed in units of 5%).

Whether or not uneven density caused by ink aggregation was present in the obtained evaluation sample, was visually observed and the print quality was determined according to the following criteria.

A: Uneven density was not observed at a Duty of 80%.
B: Uneven density was observed at a Duty of less than 80%.

As described above, it is found that the abrasion resistance and the print quality of the ink compositions in Examples 1 to 9 are excellent compared to the ink composition in Comparative Examples 1 to 4. In addition, it is also found that the redissolubility of the ink compositions in Examples 1 to 9 is excellent and thus the intermittent discharge performance was excellent.

Core-Shell Structure Stability

Figure 2:
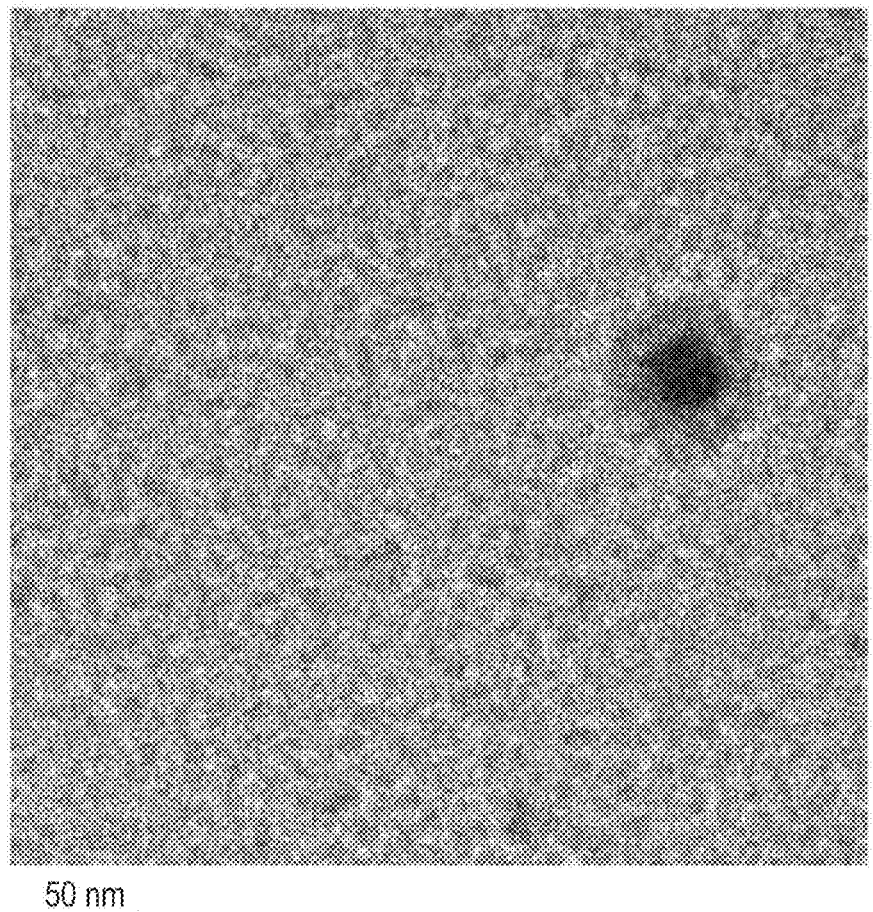
FIG. 2 is a photographed image of a polymer particle of an example.
Figure 3:
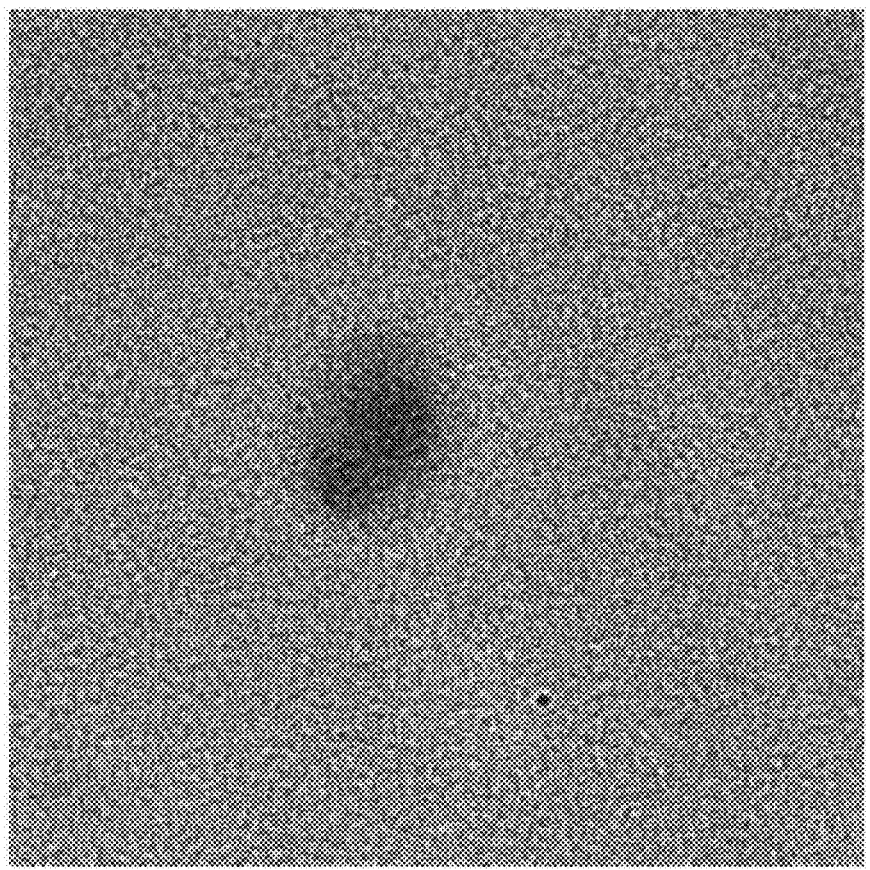
FIG. 3 is a photographed image of a polymer particle of an example.
Figure 4:
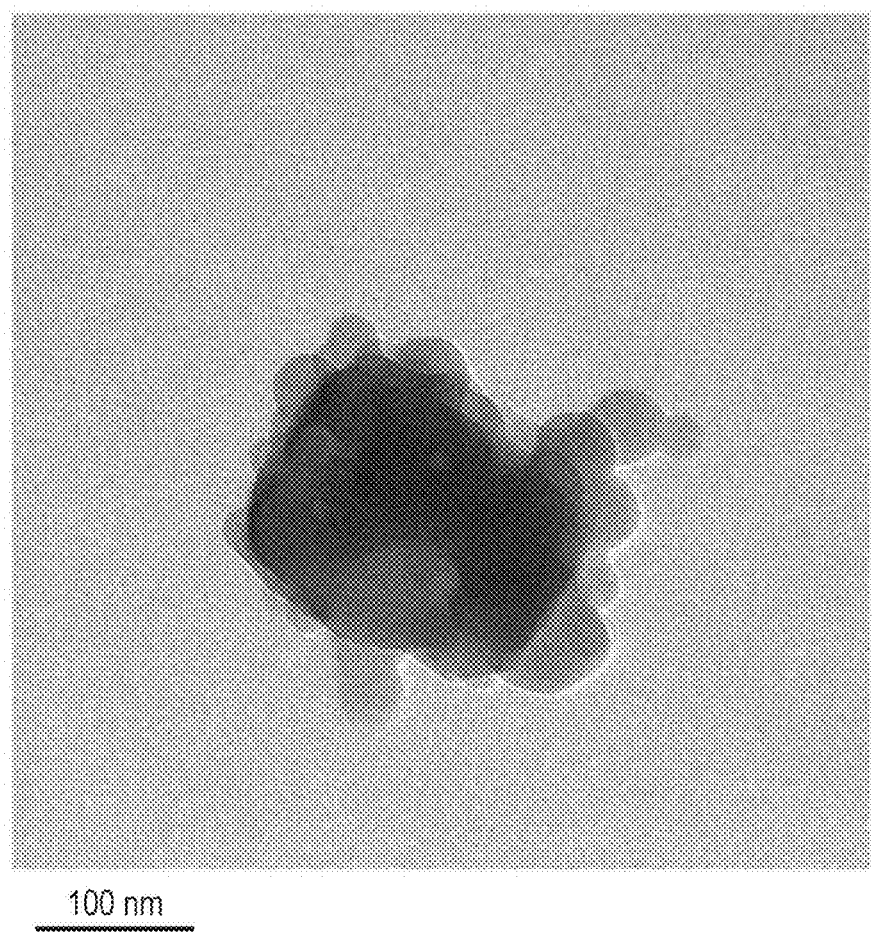
FIG. 4 is a photographed image of a polymer particle of an example of the related art.

FIGS. 2 and 3 are photographed images of polymer particles of examples. The polymer particle shown in FIG. 2 is a polymer particle in which the Tg of the core polymer is 41° C. and the Tg of the shell polymer is 75° C. The polymer particle shown in FIG. 3 is a polymer particle in which the Tg of the core polymer is 41° C. and the Tg of the shell polymer is 74° C. The polymer particles shown in FIG. 2 and have the same constituent components as the constituent components of the polymer particles in Examples 1 and 2, respectively, and only the contents thereof are changed to prepare the polymer particles. The length of the scale in FIGS. 2 and 3 is 50 nm and the length of the scale in FIG. 4 is 100 nm.

As shown in FIGS. 2 and 3, in the polymer particles of Examples, a core-shell structure in which the core polymer is formed inside the shell polymer is formed. It is found that a stable core-shell structure is formed in the polymer particles of Examples compared to the polymer particle of Comparative Example shown in FIG. 4. Due to the fact that a stable core-shell structure can be formed, it is assumed that the intended performance of the polymer particle can be exhibited in the abrasion resistance, intermittent discharge properties, and print quality.

The entire disclosure of Japanese Patent Application No. 2014-085294, filed Apr. 17, 2014 is expressly incorporated by reference herein.

What is claimed is:

1. An ink composition comprising:
   a color material;
   water; and
   polymer particles,
   wherein the ink composition does not substantially contain an alkyl polyol having a standard boiling point of 280° C. or higher,
   the polymer particle has a core-shell structure having a core polymer and a shell polymer,
   a glass transition temperature of the core polymer is 41° C. or higher,
   a glass transition temperature of the shell polymer is more than 10° C. higher than the glass transition temperature of the core polymer,
   the core polymer includes an aromatic monomer as a constituent unit, and
   the polymer particle is substantially synthesized without using an emulsifier.

2. The ink composition according to claim 1 which is recorded onto a heated recording medium.

3. The ink composition according to claim 1,
   wherein the shell polymer includes an aromatic monomer as a constituent unit, and
   the core polymer does not have an acid value.

4. The ink composition according to claim 1,
   wherein the core polymer includes butyl (meth)acrylate as a constituent monomer.

5. The ink composition according to claim 1,
   wherein the shell polymer includes methyl (meth)acrylate or (meth)acrylic acid as a constituent monomer.

6. The ink composition according to claim 3,
wherein the aromatic monomers of the core polymer and the shell polymer are respectively included in an amount of 10% by mass or more with respect to the entirety of the polymer particles, and
a ratio of the aromatic monomer of the shell polymer to the aromatic monomer of the core polymer (the aromatic monomer of the shell polymer/the aromatic monomer of the core polymer) is 0.2 to 2.0.

7. The ink composition according to claim 1, further comprising
an alkyl polyol having a standard boiling point of 150° C. or higher and 250° C. or lower and a Hansen SP value of 10 $(cal/cm^3)^{1/2}$ or more and 15 $(cal/cm^3)^{1/2}$ or less.

8. The ink composition according to claim 1,
wherein an average particle size of the polymer particles is 10 nm or more and 100 nm or less.

9. The ink composition according to claim 1,
wherein the glass transition temperature of the core polymer is 60° C. or lower.

10. A recording apparatus comprising:
the ink composition according to claim 1; and
a discharge head that discharges the ink composition.

11. A recording apparatus comprising:
the ink composition according to claim 2; and
a discharge head that discharges the ink composition.

12. A recording apparatus comprising:
the ink composition according to claim 3; and
a discharge head that discharges the ink composition.

13. A recording apparatus comprising:
the ink composition according to claim 4; and
a discharge head that discharges the ink composition.

14. A recording apparatus comprising:
the ink composition according to claim 5; and
a discharge head that discharges the ink composition.

15. A recording apparatus comprising:
the ink composition according to claim 6; and
a discharge head that discharges the ink composition.

16. A recording apparatus comprising:
the ink composition according to claim 7; and
a discharge head that discharges the ink composition.

17. A recording apparatus comprising:
the ink composition according to claim 8; and
a discharge head that discharges the ink composition.

18. The recording apparatus according to claim 10,
wherein the discharge head includes nozzles that discharge the ink composition, and
multi-size dots of the ink composition are dischargeable from one nozzle.

\* \* \* \* \*